United States Patent
Cheong et al.

(10) Patent No.: US 7,333,404 B2
(45) Date of Patent: Feb. 19, 2008

(54) ACTUATOR FOR MOBILE OPTICAL RECORDING/REPRODUCING APPARATUS

(75) Inventors: Young-min Cheong, Seoul (KR); Jin-won Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 382 days.

(21) Appl. No.: 11/030,955

(22) Filed: Jan. 10, 2005

(65) Prior Publication Data

US 2005/0168838 A1    Aug. 4, 2005

(30) Foreign Application Priority Data

Jan. 15, 2004   (KR) .................... 10-2004-0002916

(51) Int. Cl.
G11B 7/00 (2006.01)
(52) U.S. Cl. .................. 369/44.15; 347/54
(58) Field of Classification Search ............ 347/54; 359/716, 813; 369/44.16, 44.32, 44.15, 244; 310/12
See application file for complete search history.

(56) References Cited

U.S. PATENT DOCUMENTS 6,339,511 B1 *  1/2002  Tanaka ................ 359/813
7,075,872 B2 *  7/2006  Matsui ................ 369/53.19
2003/0161227 A1 *  8/2003  Chong et al. ............ 369/44.15
2003/0193854 A1    10/2003  Lee et al. ................ 369/44.16

FOREIGN PATENT DOCUMENTS

EP     1 339 051      8/2003
JP     09-306003     11/1997

OTHER PUBLICATIONS

English Search Report issued in European Patent Application No. 05250154.1 on May 22, 2006.

* cited by examiner

Primary Examiner—Juanita D. Stephens
(74) Attorney, Agent, or Firm—Stein, McEwen & Bui, LLP

(57) ABSTRACT

An actuator to be used in a mobile optical recording/reproducing apparatus, the actuator including a holder; a movable member having an objective lens to focus an incident light; a support member positioned between the holder and the movable member, by which the movable member is movable supported with respect to the holder; and a magnetic driving unit, provided on a middle portion of the movable member and at an upper portion and/or a lower portion of the movable member, to drive the movable member in a track direction and a focus direction.

19 Claims, 4 Drawing Sheets

ACTUATOR FOR MOBILE OPTICAL RECORDING/REPRODUCING APPARATUS

CROSS-REFERENCE TO RELATED APPLICATIONS

This application claims the priority of Korean Patent Application No. 2004-2916, filed on Jan. 15, 2004, in the Korean Intellectual Property Office, the disclosure of which is incorporated herein in its entirety by reference.

BACKGROUND OF THE INVENTION

1. Field of the Invention

The present invention relates to an actuator for a mobile optical recording/reproducing apparatus, and, more particularly, to an actuator for a super-slim mobile optical recording/reproducing apparatus having an asymmetric electromagnetic drive structure.

2. Description of the Related Art

Recently, as the use of mobile optical recording/producing apparatuses employing optical recording media is rapidly increasing, research on high-density optical recording media is being actively conducted.

For a user's convenience, a mobile optical recording/reproducing apparatus must be small-sized and able to reproduce/record high density information. In order to meet these requirements, an actuator for a focus drive and a track drive of an objective lens employed in the optical recording/reproducing apparatus must be miniaturized.

Referring to FIG. 1, a micro-actuator of a conventional mobile optical recording/reproducing apparatus includes a stationary member 13 provided on an end portion of a driving arm 11, a movable member 15 movable in a track direction (X-axis) and a focus direction (Y-axis), a magnetic driving unit 20 to magnetically drive the movable member 15, and a suspensor 17 to support the movable member 15 as the movable member 15 moves with respect to the stationary member 13, and to be used as a conducting path. The movable member 15 is provided with an objective lens 16 to focus incident light.

The magnetic driving unit 20 includes yokes 21 and magnets 23, which include a magnetic circuit, a focus coil (not shown) installed at both ends of the movable member 15, and four track coils 25. The focus coils and track coils 25 are provided at a side wall of the movable member 15. The suspensor 17 includes four wires, and supports the movable member 15 symmetrically with respect to the stationary member 13.

The actuator of the conventional mobile optical recording/reproducing apparatus as described above is a common symmetrical structure adopting four wires, in which components including a plurality of coils are arranged in a narrow space to provide a small-sized configuration. Since each component is arranged in a longitudinal direction of the wire at the side wall of the movable member 15, the space occupied by each component is small. Accordingly, there is a problem in that the characteristic of the actuator is deteriorated. In this case, the actuator has a height of about 4 to 5 mm, and it is difficult to obtain an actuator with a height less than the above values.

The conventional actuator includes the track coils 25 and the focus coils as the magnetic driving unit, so that the actuator can be controlled in the focus direction and the track direction only. Since the actuator does not have tilting driving means, there is a limitation regarding recording/reproducing high density data.

SUMMARY OF THE INVENTION

The present invention provides an actuator to be used in a mobile optical recording/reproducing apparatus capable of carrying out a tilting drive, to reduce the height of an arrangement of a magnetic driver to about 2.3 mm so that a slim mobile optical recording/reproducing apparatus can be obtained, wherein spaces for arranging the components are secured to prevent deterioration of the actuator.

Additional aspects and/or advantages of the invention will be set forth in part in the description which follows and, in part, will be obvious from the description, or may be learned by practice of the invention.

According to an aspect of the present invention, there is provided an actuator to be used in a mobile optical recording/reproducing apparatus, the actuator comprising: a holder; a movable member having an objective lens to focus an incident light; a support member positioned between the holder and the movable member, by which the movable member is movably supported with respect to the holder; and a magnetic driving unit, provided on a middle portion of the movable member and at an upper portion and/or a lower portion of the movable member, to drive the movable member in a track direction and a focus direction.

The magnetic driving unit may include a support plate spaced apart from the movable member at a desired interval, at least a portion of the support plate being positioned on an upper portion and/or a lower portion of the movable member; a magnet to generate a magnetic field in a desired direction; and a coil member to drive the movable member using interaction between the magnet and the coil member, wherein any one of the magnet and the coil member is provided at the support plate, and the other is provided at the movable member in a position corresponding to the one of the magnet and the coil member.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
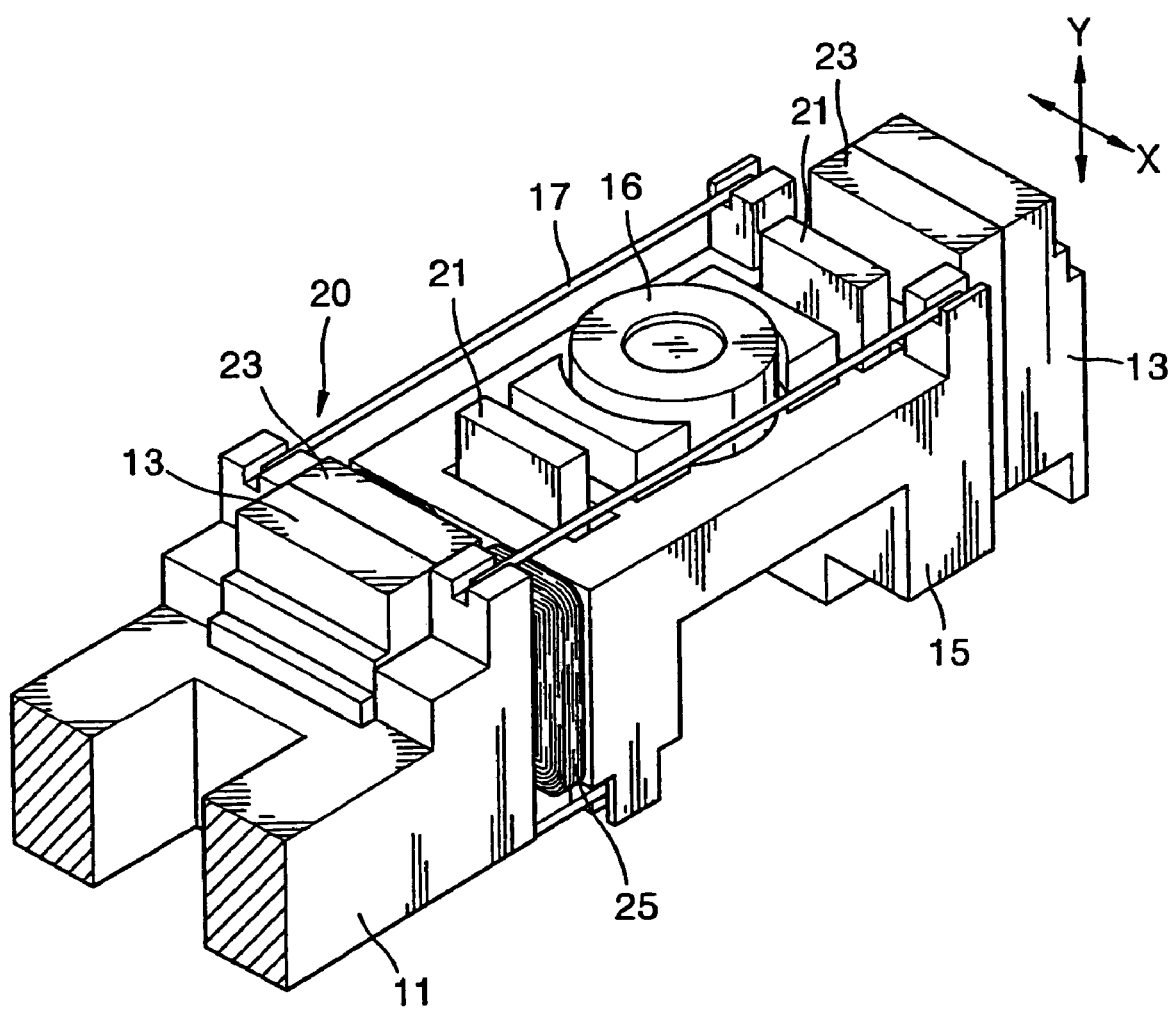
FIG. 1 is a perspective view illustrating a conventional actuator of a mobile optical recording/reproducing apparatus.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
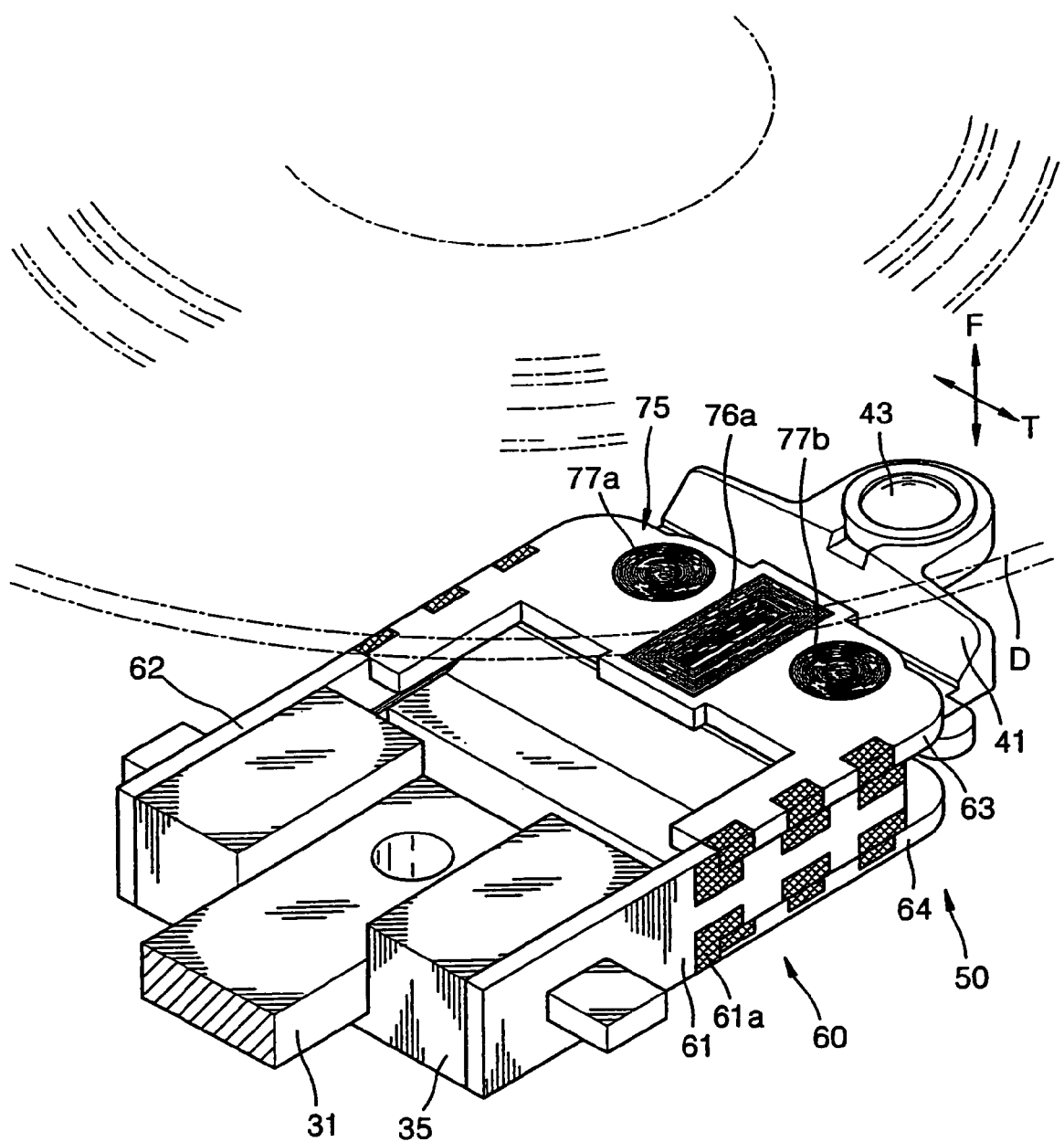
FIG. 2 is a perspective view illustrating an actuator of a mobile optical recording/reproducing apparatus according to an embodiment of the present invention.
Figure 3:
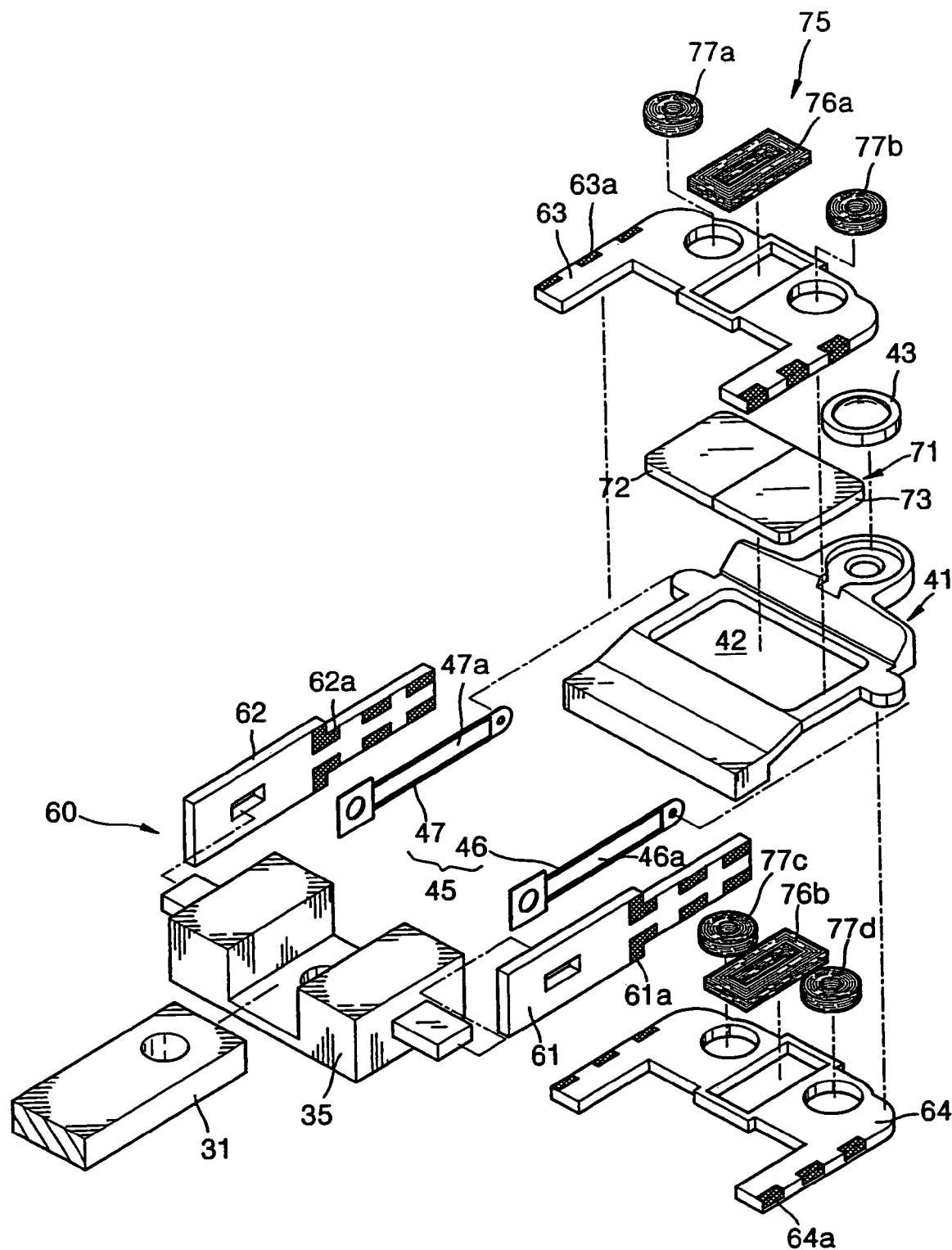
FIG. 3 is an exploded perspective view of FIG. 2.

Referring to FIGS. 2 and 3, an actuator according to an embodiment of the present invention includes a holder 35, a movable member 41, a support member 45 by which the movable member 41 is movably supported with respect to the holder 35, and a magnetic driving unit 50 to drive the movable member 41 using an electromagnetic force, a portion of the magnetic driving unit 50 being positioned on upper and lower portions of the movable member 41. The movable member 41 is provided at one end thereof with an objective lens 43 to focus incident light. The objective lens 43 is driven in a focus direction (F) and a track direction (T), thereby focusing the incident light to form an optical spot on an optical recording medium D.

The holder 35 is provided at an end portion of a driving arm 31, and the support member 45 is engaged to a portion of the holder 35. The driving arm 31 drives the actuator in a radial direction of the optical recording medium D.

The support member 45 is provided between the holder 35 and the movable member 41, and the movable member 41 is movably supported with respect to the holder 35 by the support member 45. The support member 45 is provided on both sides of the movable member 41. Preferably, though not necessarily, the support member 45 comprises a pair of plate springs 46 and 47 to movably support the movable member 41. The plate springs 46 and 47 may be provided between the holder 35 and the movable member 41 so as to be inserted in the holder 35 and/or the movable member 41. With the construction as described above, since the movable member 41 is not used as a conducting path, there are some advantages in that the configuration can be simplified, and the number of assembling processes and, therefore, assembling errors, can be reduced. In addition, since spaces 46a and 47a are formed inside the plate springs 46 and 47, respectively, the focusing operation can be smoothly performed.

A portion of the magnetic driving unit 50 is provided on a middle portion of the movable member 41, while the remaining portion or portions is/are provided at the upper portion and/or the lower portion of the movable member 41. The magnetic driving unit 50 drives the movable member 41 in the track direction (T) and the focus direction (F) of the optical recording medium D.

The magnetic driving unit 50 includes a support plate 60, and a magnet 71 and a coil member 75 which are provided on the support plate 60 and the movable member 41. A driving force is generated by interaction between the magnet and the coil member.

At least a portion of the support plate 60 is positioned on the upper portion and/or the lower portion of the movable member 41, with the support plate 60 spaced apart from the movable member 41 at a desired interval. Preferably, though not necessarily, the support plate 60 includes a pair of side plates 61 and 62, an upper plate 63, and a lower plate 64.

Each of the side plates 61 and 62 has one end portion secured to the holder 35, and the other end portion positioned on both sides of the movable member 41, respectively. The side plates 61 and 62 are used as a conducting path to apply an electric current to the coil member 75.

The upper plate 63 is positioned on the upper portions of the side plates 61 and 62, with the upper plate 63 spaced apart from the movable member 41 at a desired interval. The lower plate 64 is positioned under the lower portions of the side plates 61 and 62, with the lower plate 64 spaced apart from the movable member 41 at a desired interval. The upper and lower plates 63 and 64 are provided with a conducting path. The conducting path is formed by connecting engaging portions 61a, 62a, 63a, and 64a to the side plates 61 and 62 through soldering.

The magnet 71 is provided at a desired position 42 of the movable member 41, and the coil member 75 is provided to the upper and lower plates 63 and 64 to be opposite to the magnet 71.

The magnet 71 is a double magnet, and has a first magnet 72 magnetized in the focus direction (F) and a second magnet 73 magnetized in a direction opposed to the magnetizing direction of the first magnet 72. The first and second magnets 72 and 73 are horizontally arranged adjacent to each other. Alternatively, the first and second magnets 72 and 73 may be vertically arranged adjacent to each other, with the magnets 72 and 73 being magnetized in the track direction (T).

Figure 4:
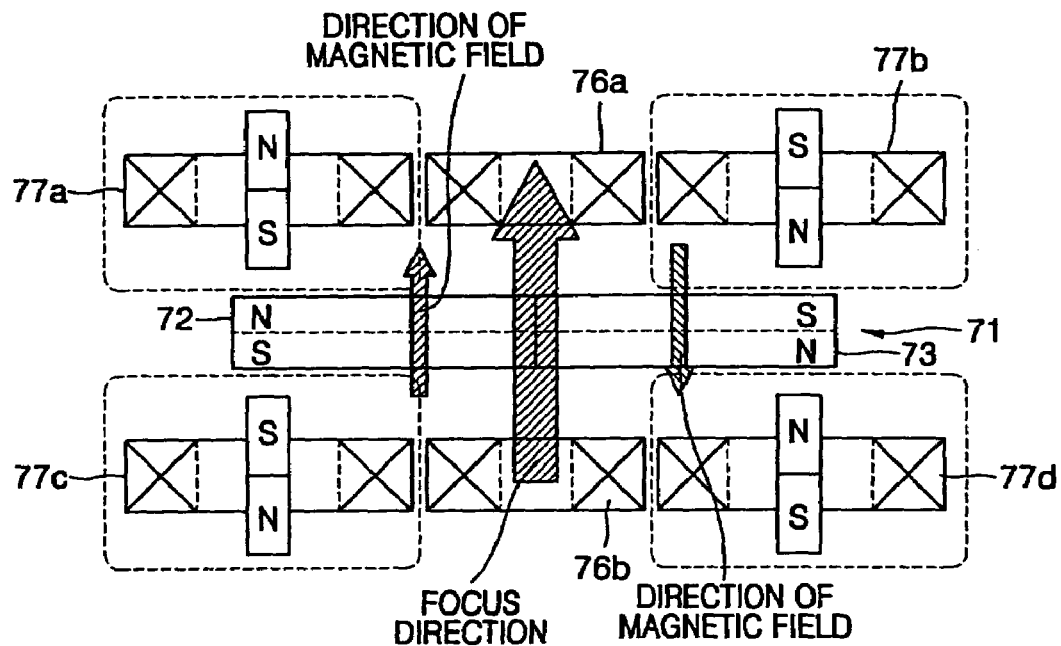
FIG. 4 illustrates a focus driving principle according to the embodiment of the present invention shown in FIGS. 2 and 3.

In the case in which the first and second magnets 72 and 73 are arranged, for example, as shown in FIG. 4, the magnets 72 and 73 generate a magnetic field in a vertical direction as shown by arrows in FIG. 4.

The coil member 75 includes a pair of track coils 76a and 76b and a plurality of focus coils 77a, 77b, 77c and 77d. The track coils 76a and 76b are respectively provided to the upper and lower plates 63 and 64 to drive the movable member 41 in the track direction (T). The focus coils 77a and 77b are respectively provided to both sides of the track coil 76a, and the focus coils 77c and 77d are respectively provided to both sides of the track coil 76b, to drive the movable member 41 in the focus direction (F). Preferably, though not necessarily, the coil member 75 is a fine pattern coil formed on each of the upper and lower plates 63 and 64 by patterning. By employing the fine pattern coil, the overall dimensions of the magnetic driving unit 50 can be reduced and the assembling capability can be improved.

According to the magnetic driving unit 50 as described above, the focus direction (F) drive is implemented by a solenoid force, while the track direction (T) drive is implemented by a Lorenz force. The operation of the magnetic driving unit 50 will now be described in detail with reference to FIGS. 4 and 5.

Referring to FIG. 4, the focus drive is implemented by the electromagnetic force resulting from the interaction between the focus coils 77a and 77b provided to the magnet 71 and the upper plate 63, and the coils 77c and 77d provided to the magnet 71 and the lower plate 64.

In this embodiment, the focus coils 77a, 77b, 77c, and 77d are wound around a cylindrical structure. When the current is applied to the focus coils 77a-77d, each of the focus coils 77a-77d acts as an electromagnet, and the movable member 41 with the magnet 71 is powered in an upward direction (or in a downward direction in the case of changing a direction of the applied current) by the interaction of the first and second magnets 72 and 73, thereby focus driving the objective lens 43. It is possible to let the objective lens 43 tilt, as well as carry out the focus drive, by changing a direction of the current to be applied.

Figure 5:
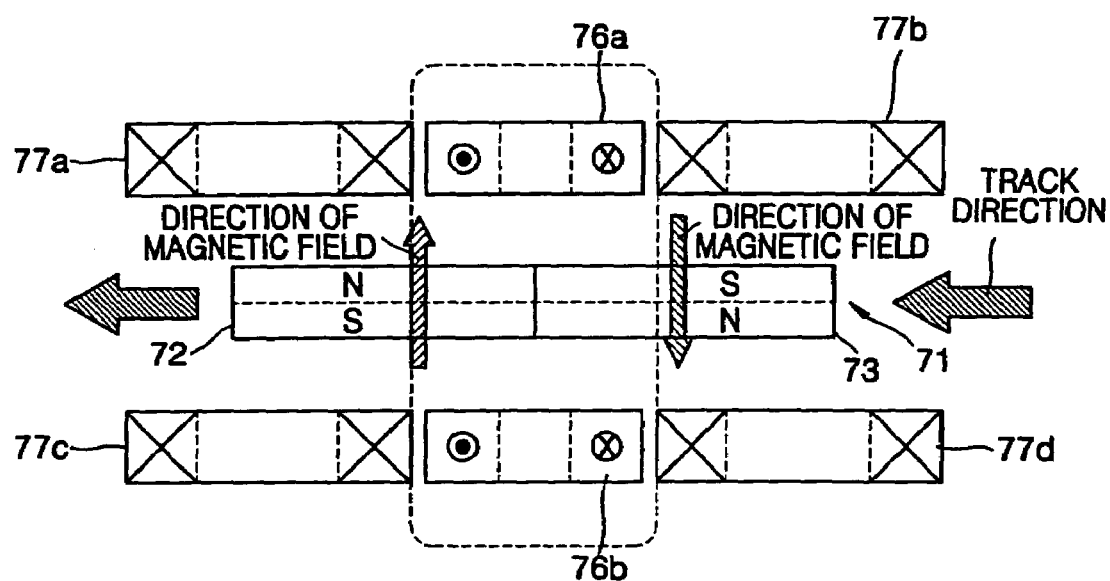
FIG. 5 illustrates a track driving principle according to the embodiment of the present invention shown in FIGS. 2 and 3.

Referring to FIG. 5, the track drive is implemented by the electromagnetic force resulting from the interaction between the magnet 71 and the track coils 76a and 76b, which are respectively provided to the upper and lower plates 63 and 64. In this embodiment, the track coils 76a and 76b have a rectangular shape. If the current is applied to the track coils 76a and 76b, a Lorenz force acts on the track coils 76a and 76b in a direction perpendicular to a direction of magnetic field and a direction of applied current according to the Fleming's left-hand law, thereby driving the movable member 41 in the track direction. FIG. 5 shows an example in which the movable member 41 is track-driven in a left direction. In this example, if a direction of the applied current is reversed, the movable member 41 is track-driven in a right direction.

In the case of constructing the actuator as described above, a focus driving sensitivity of the actuator is approximately 0.5 mm/V at DC, and is approximately 85 µm/V at an AC of 200 Hz, and a track driving sensitivity of the actuator is approximately 1.1 mm/V at DC, and is approximately 110 µm/V at an AC of 200 Hz.

Since the actuator according to an embodiment of the present invention employs the fine pattern coil, a gap between the coil and the magnet can be maintained within approximately 0.35 mm. Therefore, a height from a bottom surface of the lower plate to the objective lens is approximately 2.2 mm, thereby significantly reducing the weight of the actuator.

In addition, since the electromagnet comprises four focus coils to implement the focus control, it is possible to implement the tilting control of the objective lens without adding other components.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An actuator to be used in a mobile optical recording/reproducing apparatus, the actuator comprising:
    a holder;
    a movable member having an objective lens to focus an incident light;
    a support member positioned between the holder and the movable member, such that the movable member is movably supported with respect to the holder; and
    a magnetic driving unit, provided on a middle portion of the movable member and at an upper portion and/or a lower portion of the movable member, to drive the movable member in a track direction and a focus direction, wherein the magnetic driving unit comprises:
        a support plate having an upper plate and a lower plate, spaced apart from the movable member at a desired interval;
        a magnet to generate a magnetic field in a desired direction; and
        a coil member to drive the movable member using interaction between the magnet and the coil member;
        wherein one of the magnet and the coil member is provided at the support plate, and the other one is provided at the movable member in a position corresponding to the one of the magnet and the coil member, and
        wherein the lower plate, the movable member and the upper plate are arranged along the focus direction.

2. The actuator as claimed in claim 1, wherein the support member comprises a pair of plate springs, respectively provided to both sides of the movable member to movably support the movable member.

3. The actuator as claimed in claim 1, wherein the magnet is a double magnet.

4. The actuator as claimed in claim 1, wherein the magnet comprises:
    a first magnet portion magnetized in a track direction or a focus direction of an optical recording medium; and
    a second magnet portion magnetized in a direction opposed to the magnetizing direction of the first magnet portion, and arranged adjacent to the first magnet portion.

5. The actuator as claimed in claim 4, wherein the support member comprises a pair of plate springs, respectively provided to both sides of the movable member to movably support the movable member.

6. The actuator as claimed in claim 1, wherein the support plate comprises:
    a pair of side plates each having a first end portion secured to the holder and a second end portion respectively provided at both sides of the movable member, the side plates being a conducting path;
    the upper plate provided at upper portions of the pair of side plates, and spaced apart from the movable member at a desired interval; and
    the lower plate provided at lower portions of the pair of side plates, and spaced apart from the movable member at a desired interval.

7. The actuator as claimed in claim 6, wherein the magnet is a double magnet.

8. The actuator as claimed in claim 7, wherein the magnet comprises:
    a first magnet portion magnetized in a track direction or a focus direction of an optical recording medium; and
    a second magnet portion magnetized in a direction opposed to the magnetizing direction of the first magnet portion, and arranged adjacent to the first magnet portion.

9. The actuator as claimed in claim 6, wherein the coil member is a fine pattern coil formed on each of the upper and lower plates by patterning.

10. The actuator as claimed in claim 6, wherein the support member comprises a pair of plate springs, respectively provided to both sides of the movable member to movably support the movable member.

11. An actuator to be used in an optical recording/reproducing apparatus, the actuator comprising:
    a holder;
    a movable member having an objective lens to focus an incident light;
    a support member positioned between the holder and the movable member, such that the movable member is movably supported with respect to the holder; and
    a magnetic driving unit arranged to drive the movable member in a track direction and a focus direction, wherein the magnetic driving unit comprises:
        a support plate having an upper plate and a lower plate, spaced apart from the movable member at a desired interval;
        a magnet to generate a magnetic field in a desired direction; and
        a coil member to drive the movable member using interaction between the magnet and the coil member;
        wherein one of the magnet and the coil member is provided at the support plate, and the other one is provided at the movable member in a position corresponding to the one of the magnet and the coil member, and
        wherein the magnet is provided at a desired position of the movable member, and the coil member is provided to the upper plate and the lower plate of the support plate to be opposite to the magnet.

12. The actuator as claimed in claim 11, wherein the magnet includes:

a first magnet portion magnetized in a track direction or a focus direction of an optical recording medium; and a second magnet portion magnetized in a direction opposed to the magnetizing direction of the first magnet portion, and arranged adjacent to the first magnet portion.

13. The actuator as claimed in claim 11, wherein the coil member is a fine pattern coil formed on each of the upper and lower plates by patterning.

14. The actuator as claimed in claim 11, wherein the support member comprises a pair of plate springs, respectively provided to both sides of the movable member to movably support the movable member.

15. The actuator as claimed in claim 11, wherein the coil member comprises:

a pair of track coils respectively provided to the upper and lower plates to drive the movable member in a track direction; and a plurality of focus coils respectively provided to both sides of each of the track coils to drive the movable member in a focus direction.

16. The actuator as claimed in claim 15, wherein the magnet is a double magnet.

17. The actuator as claimed in claim 16, wherein the magnet comprises:

a first magnet portion magnetized in a track direction or a focus direction of an optical recording medium; and a second magnet portion magnetized in a direction opposed to the magnetizing direction of the first magnet portion, and arranged adjacent to the first magnet portion.

18. The actuator as claimed in claim 15, wherein the coil member is a fine pattern coil formed on each of the upper and lower plates by patterning.

19. The actuator as claimed in claim 15, wherein the support member comprises a pair of plate springs, respectively provided to both sides of the movable member to movably support the movable member.

* * * * *